United States Patent [19]

Fuertes et al.

[11] Patent Number: 5,731,430
[45] Date of Patent: Mar. 24, 1998

[54] CATIONIC POLYSACCHARIDES ESTERIFIED BY A DISCARLOXYLIC ACID ANHYDRIDE SUBSTITUTED WITH A BRANCHED CARBON CHAIN

[75] Inventors: Patrick Fuertes, Lambersart; Anne Lambin née Delmotte, Lomme; Jean-Louis Dreux, Estaires, all of France

[73] Assignee: Roquette Freres, Lestrem, France

[21] Appl. No.: 772,224

[22] Filed: Dec. 20, 1996

Related U.S. Application Data

[62] Division of Ser. No. 644,844, May 9, 1996.

[30] Foreign Application Priority Data

May 12, 1995 [FR] France .................................. 95-05665

[51] Int. Cl.$^6$ .............................. C08B 3/00; C08B 31/02; C08B 31/16
[52] U.S. Cl. .............................. 536/58; 536/63; 536/107; 536/110; 536/115; 536/119
[58] Field of Search ........................ 536/58, 63, 107, 536/110, 115, 119

[56] References Cited

U.S. PATENT DOCUMENTS

| 3,719,664 | 3/1973 | Hayes et al. ................. 106/207.1 |
| 3,732,207 | 5/1973 | Kovats ......................... 106/207.1 |
| 4,239,592 | 12/1980 | Gaspar et al. ................. 106/207.1 |
| 4,332,935 | 6/1982 | Fischer et al. . |
| 4,387,221 | 6/1983 | Tessler et al. ................. 536/107 |
| 4,613,407 | 9/1986 | Huchette et al. . |
| 4,626,288 | 12/1986 | Trzasko et al. ................. 106/210 |
| 4,872,951 | 10/1989 | Maliczyszyn et al. ........... 106/207.1 |
| 4,992,536 | 2/1991 | Billmers et al. . |
| 5,129,989 | 7/1992 | Gosset et al. . |
| 5,321,132 | 6/1994 | Billmers et al. ................. 536/48 |

FOREIGN PATENT DOCUMENTS

| 0 188 237 | 7/1986 | European Pat. Off. . |
| 0 303 039 | 2/1989 | European Pat. Off. . |
| 0 333 292 | 9/1989 | European Pat. Off. . |
| 0 350 668 | 1/1990 | European Pat. Off. . |
| 0 406 837 | 1/1991 | European Pat. Off. . |
| 0 233 336 | 11/1993 | European Pat. Off. . |
| 0 620 315 | 10/1994 | European Pat. Off. . |
| 2 477 159 | 9/1981 | France . |
| 2 063 282 | 6/1981 | United Kingdom . |
| 2 137 613 | 10/1984 | United Kingdom . |

Primary Examiner—Nathan M. Nutter
Attorney, Agent, or Firm—Henderson & Sturm

[57] ABSTRACT

The invention relates to a new composition for sizing paper and board, containing a cationic polysaccharide esterified by a dicarboxylic acid anhydride, characterized in that the said dicarboxylic acid anhydride is substituted with a carbon chain, saturated or unsaturated, of branched structure.

The anhydride may for example consist of tetrapropenyl-succinic anhydride or of any one of its isomers.

The composition for sizing according to the invention may, if necessary, contain an oxidizing agent such as a persulphate. It may advantageously be applied to the surface treatment of printing and/or writing papers, in particular of papers for envelopes and of papers for impact-free printing such as inkjet printing.

3 Claims, No Drawings

CATIONIC POLYSACCHARIDES ESTERIFIED BY A DISCARLOXYLIC ACID ANHYDRIDE SUBSTITUTED WITH A BRANCHED CARBON CHAIN

This is a divisional of co-pending application Ser. No. 08/644,844 filed on May 9, 1996, the disclosure of which in its entirety is incorporated herein by reference.

The subject of the invention is a new composition for sizing paper or board, the terms "paper" and "board" designating in the following text any flat or sheet structure, of variable sizes and thickness, not only based on cellulosic fibres—the raw material most frequently used in the paper and board industry—but also based on:

synthetic fibres such as fibres of polyamides, polyesters and polyacrylic resins, inorganic fibres such as asbestos, ceramic and glass fibres, any combinations of cellulosic, synthetic and inorganic fibres.

The composition according to the invention is applicable, inter alia, to any printing and/or writing paper.

The composition according to the invention is also applicable to the sizing of flat or sheet structures other than those mentioned above, and especially to the sizing of sheets or films of nonfibrous nature and of variable sizes, thickness and characteristics (resistance, suppleness, and the like).

In general, the notion of "flat structure" or of "sheet" is not limiting in any way, especially as regards the organic (for example polysaccharide), synthetic (for example polyolefin) and/or inorganic nature of its constituent(s). This notion covers, purely by way of information, panels or laths based on wood, board and/or paper, intended, inter alia, for the manufacture of repulpable pallets or bed bases.

It also covers polyethylene films intended, inter alia, for inkier printing.

The present invention also relates to a new process for sizing paper and board using the said composition. The term "sizing" should be understood here to comprise both any sizing applied within the entire fibrous mass, that is to say any internal sizing, the said composition thus being distributed within the mass constituting the resulting flat structure, and any external sizing (also called surface application, pasting or coating), the said composition thus being mainly or completely applied or retained on at least one of the two faces of the resulting flat structure.

It is known that the operations of sizing, especially of surface application, using polysaccharide compositions of hydrophobic character make it possible to confer on the papers and boards improved properties, in particular in terms of porosity, resistance to the penetration of water and of aqueous inks.

European Patent Application EP 350,668 describes and claims, as composition for external sizing, a starchy composition consisting of a physical mixture of 10 to 70% (by weight) of a nonhydrophobic cationic starch and 30 to 90% (by weight) of a noncationic hydrophobic starch of a specific type, in this case, of a starch monoester obtained by treating with an alkenyl succinic anhydride. In fact, the examples of this document all describe the use, as hydrophobic starch, of a starch esterified with 1-octenylsuccinic anhydride ("OSA"), an anhydride whose hydrophobic substituent is a linear chain (also called "normal" or "n-" chain) alkene containing 8 carbons.

According to the teachings of the subsequent Patent Application EP 620,315, such cationic starch/n-octenylsuccinylated starch physical mixtures would constitute effective compositions for external sizing but would pose problems of poor retention on the fibres, and therefore of pollution, when the pasted papers obtained are repulped and recycled.

Accordingly, the said Patent Application EP 620,315 claims the use, as internal or external sizing agents, of starches substituted both with cationic groups and with n-alkenylsuccinytated groups.

It will be noted, however, that the examples described in Application EP 620,315:

only really envisage the sole use of cationic starches substituted with (linear) n-octenylsuccinylated groups, only really envisage the sole external sizing of paper with such n-octenylsuccinylated cationic starches, and do not really compare, especially in terms of porosity, water absorption and inkier printing quality (black ink), the characteristics of papers pasted respectively with a physical mixture of a cationic starch and an n-octenylsuccinylated hydrophobic starch and pasted with a disubstituted starch (cationic groups+n-octenylsuccinylated groups).

It appears, in addition, that the disubstituted starches specifically recommended in Application EP 620,315 do not completely meet all the current requirements for practical use.

In particular, such cationic starches substituted with alkenylsuccinylated linear groups do not always make it possible to achieve, at the level of the finished products, completely satisfactory porosity and/or printability characteristics given the increasingly constraining specifications imposed by the market.

By way of examples, paper manufacturers are led, because of the increasingly rigorous demands of their clients, to search for means which make it possible to decrease further the porosity of papers of the "envelope" type or of the "printing" type and means capable of improving further the printability of papers intended for so-called "impact-free" printing techniques (inkier printing, laser printing, photocopying, and the like) and especially coloured inkier printing.

Thus, envelope manufacturers demand that the paper available to them has a very low porosity so that the automatic industrial devices for handling, folding and sorting, for example devices of the "suction extractor" type, allow, at each stage of manufacture, an individualized and rapid separation of each of the finished articles (envelopes) or articles being produced.

In addition, decreasing the porosity of the papers allows paper manufacturers to reduce the drastic nature, and therefore the energy cost, of the refining operations and of the subsequent draining operations, and thereby to increase the machine speed and the productivity of their plants. These advantages are generally accompanied by a desired gain in the stiffness of the resulting paper.

Moreover, the market (industrial, commercial and advertising activities and the like) is increasingly demanding envelopes which also have excellent printability and on which texts, slogans, logos or other distinctive: signs, of different colours, can easily be printed.

Sellers of ready-for-use inkier printing papers and printer manufacturers impose, moreover, extremely rigorous specifications on paper manufacturers, which papers should have constantly improved characteristics, especially in terms of colour intensity, resistance to migration of the dye(s) into the depth, and a fortiori, to the back of the sheet, sharpness of contours, resistance to the phenomenon of bleeding, gloss, and the like.

A good colour intensity in fact implies that the paper for inkjet printing has, inter alia, a low porosity which ensures that the dye(s) is (are) maintained at the surface.

Now, it appears that the disubstituted starches specifically claimed in the abovementioned Application EP 620,315, in particular of the n-octenylsuccinylated cationic starch type, do not make it possible to achieve the porosity and/or printability levels required for the sized, especially surface-treated, papers most recently developed on the market.

It results from the preceding text that there is a need to find a means adapted to the current requirements of the industrial techniques for preparing and sizing papers and boards, allowing especially the production of sheets or other flat structures having improved porosity and/or printability characteristics. Such improved properties are, inter alia, desired for sheets of paper for printing and/or writing.

To its credit, Applicant Company has found that such a means could consist of a composition containing at least one polysaccharide which is substituted both with cationic groups and with specific derivatives of dicarboxylic acid anhydride.

More precisely, the subject of the present invention is a composition for sizing paper and board, containing a cationic polysaccharide esterified by a dicarboxylic acid anhydride, characterized in that the said dicarboxylic acid anhydride is substituted with a carbon chain, saturated or unsaturated, of branched structure.

Within the framework of the present invention, "carbon chain of branched structure" is understood to mean a compound not having all of its carbons in a linear chain, contrary to the so-called "normal" or "n-" alkenyl compounds of the n-octenyl type, such as those described in Patent Application EP 620,315.

Accordingly, the said carbon chain, saturated or unsaturated, has at least one carbon chain branch, it being understood that in accordance with the invention, the location, length (especially the number of carbons) and structure (including the degree of saturation) of the said branch may be very varied as will be described more precisely below.

As a guide, the dicarboxylic acid anhydride carried by the polysaccharide contained in the composition for sizing according to the invention may, especially, be substituted with a carbon chain, saturated or unsaturated, having at one or more sites, including on the same carbon, alkylated branches, the said branches preferably containing from 1 to 5 carbon atoms.

Accordingly, the composition for sizing paper and board according to the invention is characterized in that the dicarboxylic acid anhydride is substituted with a carbon chain, saturated or unsaturated, branched at at least one site by at least one alkyl group, preferably containing from 1 to 5 carbon atoms.

According to a more preferred variant of the composition for sizing according to the invention, the said alkyl group is chosen from methyl, ethyl, n-propyl, isopropyl, n-butyl, isobutyl, sec-butyl, tert-butyl, n-amyl or isoamyl groups. In a particularly advantageous manner, the alkyl group is a methyl group.

According to another variant of the invention, the composition for sizing according to the invention is characterized in that the dicarboxylic acid anhydride is chosen from succinic, maleic, glutaric or phthalic acid anhydrides.

In a particularly advantageous manner, the said anhydride consists of succinic anhydride.

The composition for sizing paper and board according to the invention is characterized in that the dicarboxylic acid anhydride is substituted with a carbon chain of branched structure, saturated or unsaturated, containing from 4 to 24 carbon atoms, preferably from 8 to 16 carbon atoms.

The said carbon chain may be derived especially from a polymer, in particular a dimer, trimer or tetramer, of propylene or isobutylene.

In a particularly advantageous manner, the said carbon chain of branched structure is a chain, unsaturated or unsaturated, containing 12 carbon atoms.

The applicant company has discovered especially that the composition for sizing paper and board according to the invention was particularly advantageous when the dicarboxylic anhydride esterifying the polysaccharide:
consisted of succinic anhydride,
and was substituted with a branched carbon chain, saturated or unsaturated, comprising 12 carbon atoms.

Such anhydrides may consist especially of tetrapropenylsuccinic anhydride, whose formula is presented below, regardless of the mode of preparation and especially regardless of the origin and the conditions for the synthesis and binding of the branched carbon chain which it comprises.

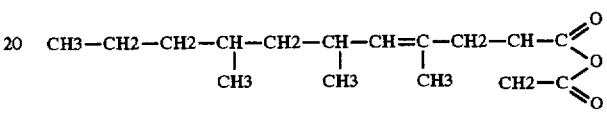

Such a carbon chain may result especially from the polymerization of propylene or isobutylene.

Such anhydrides may also consist of any isomer of tetrapropenylsuccinic anhydride, that is to say any succinic anhydride substituted with an unsaturated branched carbon chain comprising 12 carbon atoms, independently of the mode of production and of the structure of the said chain and especially of the number and of the location of any branch or of any C=C double bond that it contains, as well as of the length of any branch.

Such anhydrides may also consist of anhydrides substituted with a branched carbon chain, saturated or unsaturated, comprising 10 carbon atoms, such as iso-decenylsuccinic anhydride or any of its isomers.

Accordingly, the subject of the present invention is especially a composition for sizing paper and board containing at least one cationic polysaccharide esterified by a dicarboxylic acid anhydride, characterized in that the said anhydride is substituted with a branched carbon chain, saturated or unsaturated, comprising from 8 to 16, preferably 10 to 12, carbon atoms and, still more preferably, in that the said anhydride consists of tetrapropenylsuccinic anhydride, iso-decenylsuccinic anhydride or any of their respective isomers.

It is clear that any cationic polysaccharide contained in the composition for sizing according to the invention may be esterified by a mixture of dicarboxylic acid anhydrides, each of the said anhydrides being substituted with a different branched carbon chain, it being possible for this difference to affect the number and/or the location of the carbon atoms and/or of any possible C=C double bond, of the branched carbon chain.

For the purposes of the present invention, "polysaccharide" is understood to mean, without this list being limiting, the products chosen from the group comprising starches and other polymers of glucose or polyglucans, gums such as for example guar gums, celluloses and hemicelluloses, polymers of fructose or polyfructans such as for example inulin, polymers of xylose or polyxylans and any mixtures of at least any two of the said products.

The polysaccharide may consist especially of a starch or a guar gum, preferably a starch.

The esterified cationic polysaccharides, in particular starches, used in the compositions for sizing according to the invention may be prepared according to several variants.

Preferably but with no obligation, this preparation envisages the step of cationization prior to the esterification step.

The cationization step may be performed in an aqueous medium, in a solvent medium or in a dry phase, so as to allow one or more nitrogen-containing groups of an electropositive nature to bind to the polysaccharides, and especially to the starches or the mixtures of starches of various types and origins.

The said nitrogen-containing groups may contain especially a tertiary or quaternary nitrogen atom such as the reagents described in the following patents, filed in the name of the Applicant:

Patent FR 2,434,821, in particular from page 3, line 29, to page 5, line 10,

Patent EP 139,597, in particular column 1, lines 30 to 52, and

Patent EP 282,415, in particular page 4, lines 5 to 36, these particular passages being included in the present description.

The cationic starches preferably used in the process according to the invention may be prepared especially by any of the cationization, in particular dry-phase cationization, techniques described in Patents FR 2,434,821, FR 2,477,159, EP 233,336, EP 303,039, EP 333,292, EP 406,837, U.S. Pat. Nos. 4,332,935 and 4,492,536.

The cationic starches preferably used according to the invention, which exhibit a nonlimitative cationization level (for example a bound nitrogen level of 0.04 to 3.0%/dry weight of starch) may moreover be of a "polycationic" nature such as those described in Patents EP 406,837 and U.S. Pat. No. 4,492,536.

Preferably, within the framework of the invention, cationic starches are used which have a bound nitrogen level of about 0.05% to about 1.5%, preferably about 0.05 to 1.0%, and still more preferably between 0.09% and 1.0%, expressed over the dry weight of starch.

It is appropriate to stress the fact that the cationic starches which can be used according to the invention may consist of amphoteric products, that is to say of products which are both cationic and anionic. The anionic substituents may, by way of examples, be chosen from the group comprising phosphates, phosphonates, sulphates, sulphoalkyls, carboxyalkyls and sulphocarboxyls. Such substituents are, inter alia, described in the abovementioned Patent EP 282,415.

The said starches, of natural or hybrid origin, may be based on potatoes, potatoes with a high content of amylopectin (waxy potato starch), maize, wheat, maize with a high content of amylopectin (waxy maize), maize with a high content of amylose, rice, peas or cassava, based on cuts or fractions which may be made or obtained therefrom, such as amylose, amylopectin, the size cuts known to persons skilled in the art by the terms wheat "A" starch and wheat "B" starch, and any mixtures of at least any two of the abovementioned products.

In this regard, the cationic starch which can be used in the composition for sizing paper and board according to the invention may consist especially of at least one cationic tuber starch, in particular cationic potato starch and of at least one cationic cereal starch, in particular cationic maize or wheat starch.

Mixtures may be especially used which have cationic potato starch/cationic maize or wheat starch weight ratios ranging from about 10/90 to about 90/10, and especially from 20/80 to 80/20, it being understood that the cationization may have been performed, as described in Patent EP 139,597 in the name of the Applicant, on the mixture of the two starches or, separately, on each of the two starches, which starches are then mixed.

The cationic (including amphoteric) starches used in the composition for sizing according to the invention may have been subjected to any chemical and/or physical treatment, simultaneously, prior or subsequent to the cationization.

Preferably, such an optional treatment, for example crosslinking treatment, oxidation treatment, alkaline treatment, heat treatment, acid and/or enzymatic hydrolysis treatment or plasticization treatment, is performed, subsequent to the cationization or "amphoterization" step (by combining cationization and anionization).

The Applicant Company has found, especially when the composition for sizing according to the invention has to be used for the external sizing of paper or board, that it could be advantageous, after cationization (or amphoterization), to fluidify, especially by acid hydrolysis and/or enzymatic, hydrolysis, the cationic (or amphoteric) starch obtained, such that the latter has a water fluidity (or "WF") of about 50 to about 80. Such a fluidification, for example by using hydrochloric acid, is, in general, performed before the step of esterification of the starch (cationic or amphoteric) by the specific dicarboxylic acid anhydride used in accordance with the invention.

The said esterification step is carried out in a manner known per se, except that there are used, in accordance with the invention, dicarboxylic acid anhydrides (for example tetrapropenylsuccinic anhydride or its isomers) which, to the knowledge of the Applicant Company, have never been used up until now to esterify any cationic polysaccharide, in particular any cationic or amphoteric starch or starch derivative.

In general, a cationic starch milk, optionally fluidified, is used which has a dry matter content (DM) of about 30% to about 40%, a temperature of about 20° C. to about 50° C. and a pH of the order of 7.0–9.0. There is added to the medium about 1% to about 8%, by weight relative to the dry weight of starch contained in the starchy milk, of at least one dicarboxylic acid anhydride substituted with a carbon chain of branched structure. The esterification reaction is carried out for a period of about 1 h to about, 24 h, in a reaction medium whose temperature and pH are maintained in the abovementioned respective ranges. The duration of reaction depends especially on the anhydride level used and on the desired esterification level. The disubstituted starch obtained is, after rectification of the medium to a pH of the order of 4.0 to 8.0, washed, dried and then optionally ground.

Accordingly, the composition for sizing according to the invention is characterized in that the cationic polysaccharide consists of a cationic starch containing:

a) a bound nitrogen level of about 0.05% to about 1.5%, preferably 0.05% to 1.0%, and still more preferably 0.09% to 1.0%, expressed over the dry weight of the starch, and/or b) a level of dicarboxylic acid anhydride(s) substituted with a carbon chain, saturated or unsaturated, of branched structure, of about 1.0% to about 5%, expressed as total weight of anhydride(s) over the total weight of starch.

According to a variant of the process for preparing the composition for sizing paper and board according to the invention, after the step of esterification of the cationic polysaccharide, in particular of a cationic starch, weakly fluidified or not fluidified, an additional step of adding an oxidizing agent is carried out which makes it possible, inter alia, during subsequent cooking of the composition in order to solubilize the polysaccharide, to achieve the size viscosity desired by the paper manufacturer, it being possible indeed for the said viscosity, in some cases, not to be completely achieved by the subsequent cooking treatment alone.

Oxidizing agent is understood to mean, without this list being limiting, a product chosen from the group comprising persulphates, hypochlorites, peroxides, perborates and bromates, the said oxidizing agent preferably consisting of a persulphate, in particular sodium or ammonium persulphate. In general, when used, the oxidizing agent represents from about 0.05% to about 1.0%, in particular from 0.1% to 0.5% by weight of the esterified cationic polysaccharide contained in the composition.

It should be noted that the optional step of adding an oxidizing agent, the said step being subsequent to the steps of cationization and esterification by a dicarboxylic acid anhydride, may be performed at any time before or even during the step of cooking the composition for sizing.

Purely as a guide, this addition may take place both on the premises of the supplier of the composition for sizing and on the premises of the paper or board manufacturer. In this latter case, the oxidizing agent may be added, all at once or in part, before and/or during the cooking step.

Accordingly, the composition for sizing paper and board according to the invention is characterized in that it contains, in addition, at least one oxidizing agent chosen from the group comprising persulphates, hypochlorites, peroxides, perborates and bromates, preferably at least one persulphate.

The cooking of the said composition is carried out in a manner known per se, by batch cooking, for example in an open vat, at temperatures less than 100° C., or by continuous cooking, for example at temperatures of 100° to 150° C. in a continuous pressure cooker or "jet cooker", capable of performing the proportioning, cooking and diluting operations. Depending especially on the characteristics of the cooking equipment used, the nature and the concentration of each of the constituents of the composition for sizing, and the size viscosity desired by the paper manufacturer, the cooking time will, in practice, be of the order of a few seconds to about 5 min.

The composition for sizing paper and board according to the invention may contain, in addition to at least one cationic polysaccharide esterified by a dicarboxylic acid anhydride substituted with a carbon chain, saturated or unsaturated, of branched structure, either of the products commonly used for the sizing, especially the external sizing (surface application), of sheets or other fibrous flat structures.

These products include, without this list being limiting, pigments, fillers (in particular fillers of small particle size), sizing agents (in particular of the alkenylsuccinic anhydride or ketene dimer type), aluminium salts, colorants, optical brighteners, lubricants and antifoaming agents.

On the other hand, the composition for sizing paper and board according to the invention may be used by means of any technique known for sizing, in particular external sizing or surface application. These techniques may involve devices of the size-press, vat, roller applicator, calendering device or coating device type, and the like.

Such techniques and such devices are described especially on page 4, lines 17–26 of the abovementioned Patent Application EP 350,668, this passage being incorporated into the present description.

It is possible to use especially the composition according to the invention in the most sophisticated and efficient sizing devices commercially available, in particular in those known to persons skilled in the art by the names size-press and film-press.

Accordingly, the subject of the present invention is also a new process for sizing, in particular for the external sizing, of paper and board, characterized in that there is applied, as composition for sizing, a composition containing a cationic polysaccharide esterified by a dicarboxylic acid anhydride substituted with a carbon chain, saturated or unsaturated, of branched structure. The said composition may, within the framework of the said process, have either of the characteristics mentioned above.

By way of example, this process may, in general, be legitimately applied to the sizing, in particular the external sizing, of any printing and/or writing paper.

As already indicated and as emerges from the examples described below, the process for sizing according to the invention may be advantageously applied to the external sizing of papers for envelopes and papers for printing, in particular for impact-free printing and most particularly for inkjet printing.

It should be mentioned at this point in the description that the specific cationic polysaccharides, that is to say those esterified by "branched" dicarboxylic acid anhydride derivatives, used in the composition and the process for sizing paper and board according to the invention, constitute new products, applicable industrially, and unquestionably involving an inventive step.

Indeed, the Applicant Company has especially found that, surprisingly and unexpectedly, these specific cationic polysaccharides were not only more efficient in sizing than the cationic polysaccharides esterified by linear dicarboxylic acid anhydride derivatives claimed in the abovementioned Application EP 620,315 (including for an equal number of carbon atoms in the said derivatives), but also that these specific polysaccharides:

- could be prepared, stored, transported and/or handled under conditions at least as straightforward, or even better, than those for the cationic polysaccharides claimed in this application EP 620,315,
- could be legitimately used in fields of application other than the sizing of paper/board alone, and especially for the preparation of compositions for coating paper/board, compositions for sizing flat structures (fibrous or nonfibrous) other than paper/board, adhesives in general, surfactants, emulsifying agents, lubricating agents, water-repelling agents, flocculating agents, viscosity-promoting agents, encapsulating agents, thermoplastic materials, capillary products or detergent compositions.

Accordingly, the subject of the present invention is also, as new product, a cationic polysaccharide, in particular a cationic starch, esterified by a dicarboxylic acid anhydride substituted with a carbon chain, saturated or unsaturated, of branched structure.

According to another preferred variant, the subject of the invention is a cationic starch esterified by tetrapropenylsuccinic hydride, isodecenylsuccinic anhydride or any of their respective isomers.

The methods of preparation and the characteristics, general or preferred, of such new products have been described previously.

The invention will be understood more clearly still with the aid of the examples below which refer to some particularly advantageous modes of preparation and of use of the cationic polysaccharides and the compositions for sizing according to the invention.

EXAMPLE 1

Preparation of Cationic Polyscaaharides Conforming or Otherwise to the Invention Within the framework of this example, there is described the preparation of various cationic polysaccharides according to the invention (PRODUCTS A to D), in this case cationic starches esterified by a dicarboxylic acid hydride substituted with a carbon chain of branched structure.

The preparation of cationic polysaccharides "controls" not conforming to the invention (PRODUCTS T1, T2 and T3) is also described.

A) PRODUCT A

1) Cationization/fluidification

A maize starch milk at 32% dry matter (DM), having a temperature of 39° C., is prepared, to which there are added 2% lime (this percentage being expressed in dry weight of lime/weight of starch) and then 1.9% pure 3-chloro-2-(hydroxypropyl)trimethylammonium chloride (expressed in weight/weight of starch). The reaction pH is about 12.0 and the reaction time at 39° C. is 11 hours. The pH of the reaction medium is then decreased to a value of about 3.0 by adding hydrochloric acid (33% HCl solution), then the temperature of the reaction medium is adjusted to 51° C.

0.5% HCl, expressed in dry weight/weight of starch, is then added. The fluidification of the cationic starch is monitored by measuring the water fluidity ("WF") of the said starch.

The fluidification is stopped when the cationic starch thus fluidified by acid hydrolysis has a WF of the order of 55–62, using sodium carbonate ($Na_2CO_3$) and obtaining a pH of 5.0–5.5.

The fluidified cationic starch thus obtained is then washed. Its pH is adjusted to about 8.8 with $Na_2CO_3$. Finally, the product is dried so that it contains about 13% by weight of water.

The fluidified cationic polysaccharide obtained has a bound nitrogen level of the order of 0.12%, expressed over the dry weight of starch.

2) Esterification by tetrapropenylsuccinic anhydride (TPSA)

Starting with the dry product obtained according to step 1), a fluidified cationic starch milk at 32% DM is prepared at a temperature of about 30° C.

Hydrogen peroxide $H_2O_2$ is added until the medium is slightly oxidizing, then the pH is adjusted to 8.0. 3% tetrapropenylsuccinic anhydride (TPSA), this percentage being expressed in weight/weight of starch, is then incorporated, over 3 hours, while the pH of the reaction medium is maintained at a value of 8.0 by the addition of sodium hydroxide (NaOH).

The reaction is allowed to proceed for 4 hours at this same pH. The pH of the medium is then reduced to about. 6.5 (33% HCl solution). The product obtained, namely a fluidified cationic starch substituted with 3% by weight of TPSA, is then washed, drained and dried on a fluidized bed (water content of about 13%).

B) PRODUCT B

The procedure for producing PRODUCT B is identical to that described for PRODUCT A, except that the cationic polysaccharide which has to be esterified by 3% TPSA is a fluidified cationic maize starch having a bound nitrogen level of 0.10% by weight and a water fluidity (WF) greater than that of PRODUCT A, namely of the order of 72–78 (instead of 55 . 62).

C) PRODUCT C

The procedure for producing PRODUCT C is identical to that described for PRODUCT A, except that after esterification by TPSA, 0.1% by weight of ammonium persulphate, expressed by weight of disubstituted fluidified starch, is added to the starchy composition.

D) PRODUCT D

The procedure for producing PRODUCT D is identical to that for PRODUCT C except that 0.3% by weight of ammonium persulphate is used after double substitution (TPSA esterification/cationization).

E) PRODUCT T1 (NOT CONFORMING TO THE INVENTION)

The procedure for producing PRODUCT T1 is identical to that described for PRODUCT A except that the fluidified cationic starch obtained at the end of step 1) is not subjected to any step of esterification by any anhydride.

PRODUCT T1 is therefore a monosubstituted polysaccharide, in this case solely substituted with cationic groups.

F) PRODUCT T2 (NOT CONFORMING TO THE INVENTION)

The procedure for producing PRODUCT T2 is identical to the procedure described for PRODUCT A except that:

1) the fluidified cationic starch which has to be esterified has a bound nitrogen level of 0.21% and a fluidity (WF) of between 62–68, 2) and in particular that the fluidified cationic starch is esterified, as recommended in the abovementioned Patent Application EP 620,315, by n-octenylsuccinic anhydride, that is to say by an anhydride substituted with a linear carbon chain.

G) PRODUCT T3 (NOT CONFORMING TO THE INVENTION)

The procedure for producing PRODUCT T3 is identical to the procedure described for PRODUCT A except that the fluidified cationic starch (bound nitrogen level: 0.12%, WF of 55–62) is esterified by an anhydride substituted with a linear carbon chain containing 12 carbon atoms, in this case esterified by n-dodecenylsuccinic anhydride (or "n-DDSA"). It will be noted that the use of n-DDSA is more difficult because of the fact that the product is provided in the form of a pasty solid product at room temperature.

EXAMPLE 2

Preparation of Compositions for Sizing

Within the framework of this example, each of PRODUCTS A to D (polysaccharides conforming to the invention) and the "control" cationic polysaccharides (PRODUCTS T1, T2 and T3) is used in the form of an aqueous dispersion having a dry matter content (DM) of the order of 10.5–12%.

The dispersions obtained are then subjected to a heat treatment in an "open vat" type batch cooker for 15 minutes at 95°–98° C., so as to solubilize the starch.

There are thus obtained:

respectively from PRODUCTS A to D, the COMPOSITIONS A to D (compositions for sizing according to the invention), and from respectively PRODUCTS T1, T2 and T3, the COMPOSITIONS T1, T2 and T3 (compositions for sizing not conforming to the invention).

In addition, a dispersion at 11% DM, prepared from a mixture of PRODUCT T1 (nonesterified cationic starch) and 10%, relative to the weight of starch, of fluidified anionic guar gum called "MEYPRO-FILM 222" marketed by MEYALL CHEMICAL AG, is subjected to the same heat treatment in a continuous cooker.

The composition for sizing obtained, not conforming to the invention, is called "COMPOSITION T4".

Moreover, an aqueous dispersion at 12% DM of PRODUCT B is subjected to a heat treatment in a "jet-cooker" type continuous cooker for 26 seconds at 145° C.

The composition for sizing obtained, conforming to the invention, is called below COMPOSITION B2.

The BROOKFIELD viscosity at 60° C. (speed: 100 revolutions/minute) of each of the compositions for sizing thus prepared is measured as in Patent Application EP 620,315.

The compositions conforming to the invention have the viscosities below, expressed in mPa.s or centipoises:

COMPOSITION A: 240 mPa.s
COMPOSITION B: 180 mPa.s
COMPOSITION B2: 120 mPa.s
COMPOSITION C: 200 mPa.s
COMPOSITION D: 92 mPa.s

The compositions not conforming to the invention have the viscosities below:

COMPOSITION T1: 120 mPa.s
COMPOSITION T2: 96 mPa.s
COMPOSITION T3: 135 mPa.s
COMPOSITION T4: 144 mPa.s

EXAMPLE 3

Use of the Compositions for Sizing Paper

Within the framework of this example, the conditions are described for using the compositions for sizing, conforming or not conforming to the invention, for the external sizing (or surface application) of paper.

The paper used is wood-free paper of the printing/writing type having a substance of 78 g/m$^2$, an ash level of 24% (at 450° C.) and a BENDTSEN porosity of 1330 ml/minute. The deposition of each of the compositions on the said paper is made at a level of the order of 4 g/m$^2$, by using a laboratory coating device with a size-press.

EXAMPLE 4

Porosity of the Papers Obtained with the Compositions for Sizing

The porosity of the surface-treated papers obtained and of a non-surface-treated "control" paper is evaluated by means of a BENDTSEN Model V test apparatus with a direct indicator of porosity.

The porosity is expressed in ml of air/minute, it being understood that the greater this volume of air, the greater the porosity of the paper and the less the said paper is "closed" and applicable overall to printing and/or writing.

The control paper, not sized, has, as indicated above, a BENDTSEN porosity of 1330 ml/min.

The same paper, surface treated respectively with either of the compositions according to the invention A to D (including B2) and not conforming to the invention T1 to T4, has the porosity below:

with COMPOSITION A: 80 ml/min
with COMPOSITION B: 35 ml/min
with COMPOSITION B2: 140 ml/min
with COMPOSITION C: 55 ml/min
with COMPOSITION D: 130 ml/min
with COMPOSITION T1: 650 ml/min
with COMPOSITION T2: 300 ml/min
with COMPOSITION T3: 350 ml/min
with COMPOSITION T4: 460 ml/min These results show that COMPOSITIONS A to D according to the invention make it possible to obtain porosities which are very significantly reduced compared with those obtained with COMPOSITIONS T2 and T3 as recommended in the abovementioned Application EP 620,315.

It is, inter alia, remarkable to note that the PRODUCT A contained in COMPOSITION A, namely a cationic polysaccharide esterified by an anhydride substituted with a carbon chain containing 12 carbon atoms of branched structure is a lot more efficient than the product T3 prepared in the same manner as the said PRODUCT A, except that PRODUCT T3 is esterified by an anhydride substituted with a carbon chain, also comprising 12 carbon atoms, but of linear structure.

Such performances of the cationic polysaccharides and compositions for sizing according to the invention were unsuspected and perfectly illustrate the industrial benefit which can be expected within the framework of their use for reducing the porosity of flat or sheet structures of the "board" or "paper" type, in particular of printing and/or writing papers such as papers for envelopes.

EXAMPLE 5

Colour Inkjet Printing Quality Obtained with the Compositions for Sizing

Within the framework of this example, the colour inkjer printing quality of surface-treated papers obtained after using respectively each of the compositions for sizing A to D according to the invention and T1 to T4 not conforming to the invention is evaluated.

The printing test is performed on an "HP 560" type colour inkjet printer marketed by HEWLETT PACKARD. The papers are printed according to the test IV computer programme called "Paper Acceptance Criteria for HEWLETT PACKARD DESKJET 500 C".

In the present case, there is evaluated more particularly the highly selective criterion of printing quality obtained for black and yellow colours and especially the contrast and the sharpness of the contours of the zones thus coloured and the possible bleeding of the black and yellow dyes.

This evaluation makes it possible to establish the following classification of surface-treated papers, in decreasing order of colour inkier printing quality.

1—papers surface-treated with COMPOSITIONS B or B2
2—papers surface-treated with COMPOSITIONS A or C
3—papers surface-treated with COMPOSITIONS D or T3
4—paper surface-treated with COMPOSITION T2
5—paper surface-treated with COMPOSITION T1
6—papers surface-treated with COMPOSITION T4

These results show that the compositions for sizing according to the invention generally make it possible to achieve a colour inkier printing quality superior to that obtained with the compositions recommended by the abovementioned Patent Application EP 620,315. The compositions A to D according to the invention all especially proved to be, for this printing test, more efficient than COMPOSITION T2, which contains the cationic polysaccharide (PRODUCT T2) more particularly described and claimed in the abovementioned application.

Other tests of external sizing were performed on compositions (sizes) containing either of the two cationic starches according to the invention below:

1) Cationic maize starch (bound nitrogen level∝0.14%), fluidified (WF∝60) and esterified by about 1.2% tetrapropenylsuccinic anhydride ("TPSA"),
2) Cationic maize starch (bound nitrogen level∝0.14%), fluidified (WF∝5) and esterified by about 1.2% isododecenylsuccinic anhydride ("IDSA").

The sizes were obtained from aqueous dispersions at 11–12% DM, having undergone a heat treatment in a "jet-cooker" at 140° C. for 3 minutes.

The results of these tests showed overall that a cationic starch according to the invention, esterified by IDSA was as efficient (porosity, inkier printing quality) as a cationic starch according to the invention, treated with TPSA.

EXAMPLE 6

Use of a Cationic Polysaccharide According to the Invention as Emulsifying Agent Within the framework of this example, the emulsifying properties of a cationic polysaccharide according to the invention, in this case PRODUCT A described in EXAMPLE 1, are studied.

In the present case, these properties are exploited in the field of preparation of lubricants for the cold deformation of metals and especially the forming of sheet metals.

In this field, it is sometimes difficult to propose homogeneous lubricants, provided especially in the form of pastes, having high percentages (for example greater than 20, or even 30% by weight) of sodium or calcium stearate.

The use of PRODUCT A according to the invention makes it possible to achieve such levels of introduction of stearate as described below.

200 g of a size at 6% DM of PRODUCT A are introduced into a laboratory blender with a capacity of 0.8 l marketed by the company KUSTNER FRERES S.A., the said size being obtained in an open vat at 95° C. as described in Example 2 and having been neutralized to pH 7 with lime. 50 g of calcium stearate are then introduced. After blending for 20 minutes, the mixture, which was originally heterogeneous, is in a perfectly homogeneous form. This intermediate composition is then brought into contact with 50 g, again, of calcium stearate. After blending for 20 minutes, a pasty composition is obtained which is also perfectly homogeneous and thus contains 33% by weight of stearate.

The result is that the PRODUCT A conforming to the invention proves to be an emulsifying agent which is particularly suited to the suspension of a stearate and to the production of a homogeneous lubricant containing a high quantity of the said stearate.

The excellent emulsifying function of PRODUCT A thus revealed can obviously be exploited for the preparation of various emulsifying or lubricating agents useful for applications other than the deformation of metals.

EXAMPLE 7

Use of a Cationic Polysaccharide According to the Invention for the Internal Sizing of Paper Within the framework of this example, the benefit of a cationic polysaccharide according to the invention as agent for the internal sizing of paper, also called "bulking agent" is studied.

The cationic polysaccharide according to the invention envisaged here consists of a cationic maize starch (bound nitrogen level∝0.38%), nonfluidified, and esterified by about 1.2% tetrapropenylsuccinic anhydride ("TPSA"). It is designated "PRODUCT E".

The "control" cationic polysaccharide envisaged here consists of a cationic maize starch (bound nitrogen level∝0.38%), nonfluidified and nonesterified. It is designated "PRODUCT T5".

A fibrous mass is prepared containing a mixture of a soda pulp based on long fibres and a soda pulp based on short fibres, to which drinking water is added such that the concentration of the resulting pulp is about 6 g/l.

35% by weight of calcium carbonate ($CaCO_3$) is then added thereto so that the concentration of the pulp thus charged is around 8 g/kg.

Starting with the said charged pulp, a fibrous mass having a concentration of about 3 g/kg and an ash level of less than 30% is reconstituted by dilution in drinking water.

Within the framework of this example, the performances (starch and charge retention level, total retention level, internal cohesion) of PRODUCTS E and T5 are studied.

These two starches were prepared in the form of a size on a continuous cooking apparatus, under the following conditions:

milk at 10% dry matter (DM), cooking temperature: 120° C., cooking time: 20 seconds, on-line dilution: 700/1 hour.

These compositions based on cationic starch conforming or nonconforming to the invention are tested as "bulk" additives on a TECHPAP "small automatic retention mould".

The procedure, for these tests, is carried out using an amount of 1.5% dry cationic starch relative to the dry matter content (DM) of the pulp.

The contact time between the cationic additive and the pulp is 4 minutes.

For each of the sizes based on PRODUCTS E and T5, the following parameters are measured:

starch retention level or "SR" in %, total retention level or "TR" in %, charge retention level or "CR" in %, and internal cohesion of the sheets obtained (according to the SCOTT-BOND test) or "IC" in joules/m$^2$ (J/m$^2$).

The following results are obtained:

|  | PRODUCT E | PRODUCT T5 |
|---|---|---|
| SR (%) | 68.9 | 62.3 |
| TR (%) | 79.3 | 79.3 |
| CR (%) | 41.5 | 40.7 |
| IC (J/m$^2$) | 243 | 232 |

These results show that in the application envisaged here (internal sizing of paper), a cationic starch according to the invention, that is to say one which is esterified by an anhydride substituted with a branched carbon chain, proves overall to be more efficient than a nonesterified cationic starch. Nothing in the prior art foresaw such improved performances in internal sizing by virtue of the use of a cationic starch thus esterified.

We claim:

1. Cationic polysaccharide, esterified by a dicarboxylic acid anhydride substituted with a carbon chain, saturated or unsaturated, of branched structure.

2. Cationic polysaccharide according to claim 1, wherein the polysaccharide is starch.

3. Cationic starch esterified by tetrapropenylsuccinic anhydride, any succinic anhydride substituted with an unsaturated branched carbon chain comprising 12 carbon atoms, isodecenylsuccinic anhydride or any other succinic anhydride substituted with a monounsaturated carbon chain of branched structure comprising 10 carbon atoms.

* * * * *